United States Patent
Glassman et al.

(10) Patent No.: US 6,424,953 B1
(45) Date of Patent: Jul. 23, 2002

(54) ENCRYPTING SECRETS IN A FILE FOR AN ELECTRONIC MICRO-COMMERCE SYSTEM

(75) Inventors: Steven C. Glassman, Mountain View; Mark S. Manasse, San Francisco, both of CA (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/273,240

(22) Filed: Mar. 19, 1999

(51) Int. Cl.[7] .................. G06F 17/60; H04L 9/28
(52) U.S. Cl. .............. 705/50; 705/1; 705/51; 705/67; 713/200; 380/268; 380/46
(58) Field of Search .............. 705/1, 67, 7, 50, 705/51, 57, 58; 713/189, 200; 380/255, 259, 268, 46

(56) References Cited

U.S. PATENT DOCUMENTS

| | | | |
|---|---|---|---|
| 5,148,479 A | * 9/1992 | Bird et al. ............... | 380/23 |
| 5,339,361 A | 8/1994 | Schwalm et al. ......... | 380/23 |
| 5,778,065 A | * 7/1998 | Hauser et al. ............ | 380/21 |
| 5,802,497 A | 9/1998 | Manasse ................. | 705/27 |
| 5,878,140 A | 3/1999 | Chaum .................. | 380/24 |
| 5,913,203 A | * 6/1999 | Wong et al. ............. | 705/39 |
| 5,917,168 A | 6/1999 | Nakamura et al. ........ | 235/379 |
| 5,930,777 A | 7/1999 | Barber .................. | 705/40 |
| 5,935,246 A | * 8/1999 | Benson ................. | 713/200 |
| 5,987,438 A | 11/1999 | Nakano et al. ........... | 705/41 |
| 6,029,150 A | 2/2000 | Kravitz ................. | 705/39 |
| 6,039,250 A | 3/2000 | Ito et al. ............... | 235/380 |
| 6,047,242 A | * 4/2000 | Benson ................. | 702/35 |
| 6,058,381 A | * 5/2000 | Nelson ................. | 705/40 |
| 6,105,864 A | 8/2000 | Shiobara et al. .......... | 235/379 |

FOREIGN PATENT DOCUMENTS

| | | | |
|---|---|---|---|
| CA | 2218178 | 8/1997 | ........... H04L/9/30 |
| EP | 0 848 343 A2 | 6/1998 | ........... G06F/17/60 |
| EP | 895149 A1 * | 2/1999 | ........... G06F/1/00 |
| JP | 10-171887 | 6/1998 | ........... G06F/17/60 |
| WO | WO 97/17678 | 5/1997 | ........... G07F/7/08 |
| WO | WO 98/34203 | 8/1998 | ........... G07F/19/00 |

OTHER PUBLICATIONS

"Microsoft Press COmputer Dictionary," Microsoft Press, 1997, p. 182.*

Schneier, "Applied Cryptography, Protocols, Algorithms and Source Code in C," John Wiley & Son, New York, XP–002143530, pp. 139–147, 174–175, 351–354 (1996).

* cited by examiner

*Primary Examiner*—Kyle J. Choi
*Assistant Examiner*—Marc Norman
(74) *Attorney, Agent, or Firm*—Fenwick & West LLP

(57) ABSTRACT

An electronic commerce system and method includes a broker computer system having a database of scrips, a vendor computer, and a consumer computer system having a wallet protected by a pass phrase. To strengthen the pass phrase, the wallet adds a nonce and a random phrase having a length determined by the processing speed of the computer system. The internal phrase is hashed with another nonce to form a checksum, which is stored in the wallet. A portion of each scrip is encrypted by hashing a unique nonce and the internal pass phrase. XORing the scrip with the hash, and storing the encrypted portion and nonce in the wallet. The wallet adds another nonce and random string to form an internal pass phrase. To use the scrip, the user provides the pass phrase, The wallet verifies that the phrase is correct, and if so, decrypts the scrip.

20 Claims, 5 Drawing Sheets

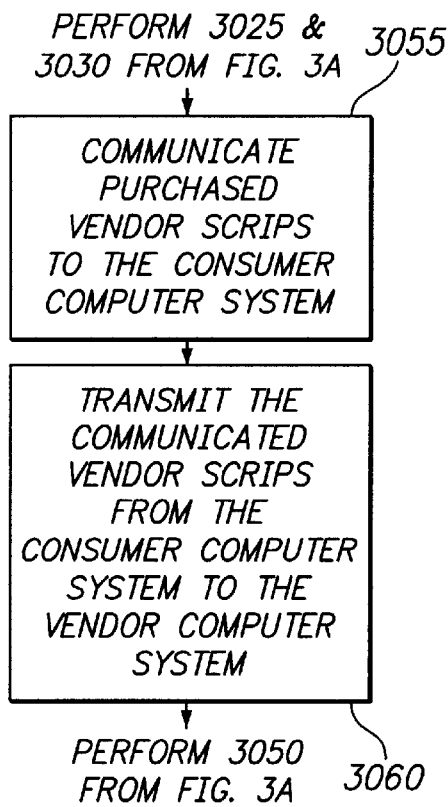
FIG. 3B
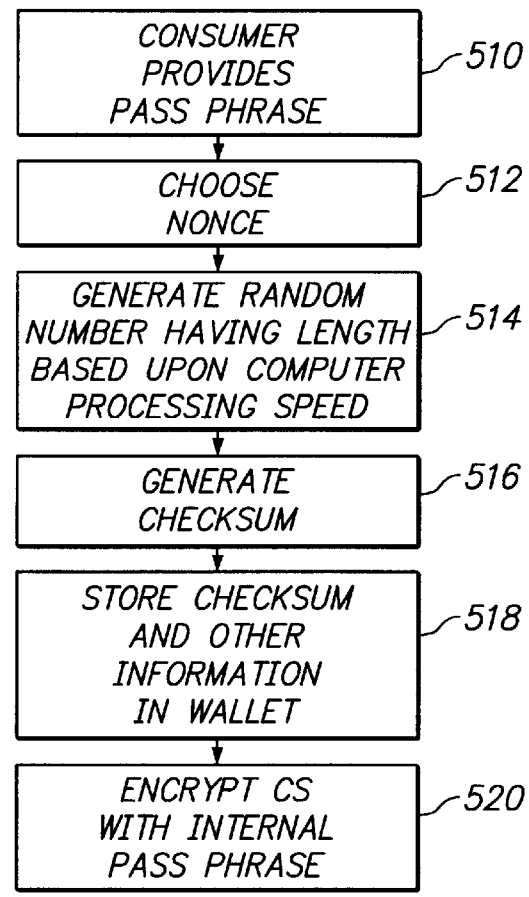
FIG. 5
| VENDOR | VALUE | SCRIP ID | CUSTOMER ID | EXPIRES | PROPS | STAMP |
|---|---|---|---|---|---|---|
| 410 | 412 | 414 | 416 | 418 | 420 | 422 |
FIG. 4

ENCRYPTING SECRETS IN A FILE FOR AN ELECTRONIC MICRO-COMMERCE SYSTEM

RELATED APPLICATIONS

This application is related to U.S. Pat. No. 5,802,497, entitled METHOD AND APPARATUS FOR CONDUCTING COMPUTERIZED COMMERCE, which issued on Sep. 1, 1998 and is hereby incorporated by reference herein.

This application is also related to U.S. patent application Ser. No. 09/081,521, entitled METHOD FOR COMMUNICATING SECURE AND AUTHENTICATED TRANSACTIONS OVER AN NON-SECURE NETWORK SUBJECT TO EXPORT RESTRICTIONS, which was filed on May 19, 1998, and is hereby incorporated by reference herein.

This application is also related to U.S. patent application Ser. No. 09/273,102, entitled ANONYMOUS PURCHASES WHILE ALLOWING VERIFIABLE IDENTITIES FOR REFUNDS RETURNED ALONG THE PATHS TAKEN TO MAKE THE PURCHASES, which was filed on the same day as the present application and is hereby incorporated by reference herein.

BACKGROUND

1. Field of the Invention

This invention relates generally to electronic commerce systems and more particularly to using encryption to protect data in the system.

2. Background of the Invention

With the advent of electronic forms of communication, including telegraph, telephone, radio, television, and more recently digital networks, it has become possible to conduct commerce electronically using digital computer systems. Electronically encoded funds are different than physical currency in that it is a trivial matter to duplicate electronic representations of funds. The most difficult task faced in conducting computerized commerce is to detect the illegal re-use of electronic funds, e.g., double spending.

Known electronic fund transfer systems generally require a "trusted" third party between the vendor and consumer to authenticate the validity of the electronic funds. The requirement of a third party adds expense to every transaction because of the cost of extra communications and encryption. In addition, current electronic fund transfer networks, e.g., Western Union and Federal Reserve banks, typically require physically secure communications media which is immune to "eavesdropping." Such secure networks are generally not available to consumers at large.

Alternative methods of electronic fund transactions involve establishing a long-term relationship between the vendor and consumer, either through a subscription service or by billing accounts as are provided by credit card organizations. These methods are efficient at handling transaction requests, assuming a reasonable authentication scheme. However, these methods require a prior effort to establish an "account" or other evidence of credit worthiness. For a large number of consumers, e.g. all potential users of a large network of computers like the Internet, setting up accounts and maintaining credit information adds expense to the vendors, and inconvenience and impediments to the consumers.

The recent growth of public access communications networks, such as the Internet, has accelerated the need for a low-cost computerized electronic commerce system. In addition, in the information marketplace there is a particular need to economically support transactions that are for amounts as small as a hundredth of a cent.

U.S. Pat. No. 5,802,497 (the '497 patent) describes a lightweight and secure protocol for electronic commerce over the Internet. The protocol is designed to support purchases costing less than a cent. The system is based on decentralized validation of electronic cash at a vendor's server, without any additional communication, expensive encryption, or off-line processing.

Two innovations in the '497 patent are its use of brokers and scrip. Brokers take care of account management, billing, connection maintenance, and establishing accounts with vendors. Scrip is digital cash that is valid for only a specific vendor. The vendor locally validates the scrip to prevent customer fraud, such as double spending.

Every time a user visits a new vendor, the user must get scrip for that vendor from a broker. Scrip is held and manipulated by the user using an application called a "wallet." The wallet includes scrip with each request to purchase content and gets back change from the vendor with the returned content.

For each piece of scrip in the wallet, the wallet holds a secret (the "Customer Secret" or "CS"). The wallet uses the CS to prove to the vendor that the consumer is authorized to spend the scrip. The wallet must protect the CS from third parties. Otherwise, an unauthorized third party with access to the wallet could spend the scrip.

Accordingly, there is need to encrypt the scrip's CS stored by the wallet. The encryption should be relatively robust (i.e., difficult to decipher), but need not be excessive given the low value of the scrip. Moreover, the encryption should not add excessive overhead to the electronic commerce system nor make the system harder to use by the consumer.

SUMMARY OF THE INVENTION

The above needs are met by a method and system of conducting computerized commerce on a number of computer systems connected by a computer network. The system includes a broker computer system having a database of broker scrips, each broker scrip representing a form of electronic currency. The system also includes a vendor computer system having a database containing products which may be exchanged for the broker scrips, the vendor computer system capable of providing vendor scrips. In addition, the system includes a consumer computer system having a user interface whereby a consumer may initiate transactions in the consumer computer system to obtain one or more of the products contained in the database of the vendor computer system.

Each piece of scrip has a value, which may range from a few dollars to a few hundredths of a cent. In addition, each piece of scrip has a Scrip ID which uniquely identifies the scrip and a Customer ID which identifies the consumer entitled to spend the scrip. The scrip also has a stamp that is used to verify that the scrip has not been altered.

When issuing scrip, the broker generates a customer secret (CS) from the Customer ID and sends the CS and scrip to the consumer. If the CS is the first CS received by the consumer, the broker uses a secure channel to transmit the CS. Otherwise, the broker uses the old CS to communicate the new CS to the consumer without actually transmitting the new CS in the clear. The consumer holds the scrip and its associated CS in a database called a "wallet."

When the consumer desires to purchase product from the vendor, the consumer sends the vendor a request, the scrip, and a hash of the scrip, request, and CS. Preferably, the hashing algorithm is MD5, although other hashes can be used instead. The vendor verifies that the consumer has not tampered with the scrip and verifies that the consumer possesses the correct CS. If the consumer has transmitted valid scrip and proves knowledge of the correct CS, the vendor provides the requested product to the consumer.

To keep third parties from accessing the wallet and spending the consumer's scrip, the customer secrets in the wallet are encrypted using a consumer-provided pass phrase. To strengthen the pass phrase, the wallet preferably concatenates the consumer-provided phrase with a first nonce (a random, guaranteed unique string) and a short random number, thereby forming an internal pass phrase. The length of the short random number, i.e. the number of bits in the number, is determined by the processing power of the consumer's computer system. The first nonce is stored in a header of the wallet file.

The wallet hashes the internal pass phrase with a second nonce to generate a checksum. Then, the wallet stores a triple having the checksum, the second nonce, and the length of the short random number. In addition, the wallet encrypts the CS associated with each scrip by hashing a unique nonce with the internal pass phrase and then XORing the result with the CS. For each scrip, the wallet stores a triple holding the scrip, the nonce used to encrypt the CS, and the encrypted CS. Preferably, all of the nonces and the short random number are changed, and the checksum and hashes are regenerated, each time the wallet is written.

To unlock the wallet and spend the scrip, the consumer provides a pass phrase. The wallet concatenates the provided pass phrase with the first nonce. In addition, the wallet appends a random number having the length read from the triple holding the checksum to the provided pass phrase/first nonce string. Then, the wallet calculates the hash of the second nonce and the provided pass phrase, the first nonce, and the random number, and determines whether the result matches the checksum. The hash is performed with all possible values for the random number until either a match is found or all possible values have been tried. If a match is found, the wallet treats the concatenation of the consumer's pass phrase, the nonce, and the random number as a single internal pass phrase. Then, the wallet decrypts the CS in the wallet by hashing the nonce for the scrip with the internal pass phrase and XORing the result with the encrypted CS. If no match is found, then the consumer, or some unauthorized party, has given an invalid pass phrase. Thus, the encrypted CS cannot be decrypted, and the scrip cannot be spent, without the proper consumer-provided pass phrase.

BRIEF DESCRIPTION OF THE DRAWINGS

FIG. 3B is a flow chart of other operations depicted in FIG. 3;

FIG. 4 is a block diagram illustrating the data fields of a piece of scrip used in the system of FIG. 1;

FIG. 5 is a flowchart illustrating the steps performed by a preferred embodiment of the present invention to password protect the scrip in the wallet from a third party attack;

DETAILED DESCRIPTION OF THE PREFERRED EMBODIMENTS

Figure 1:
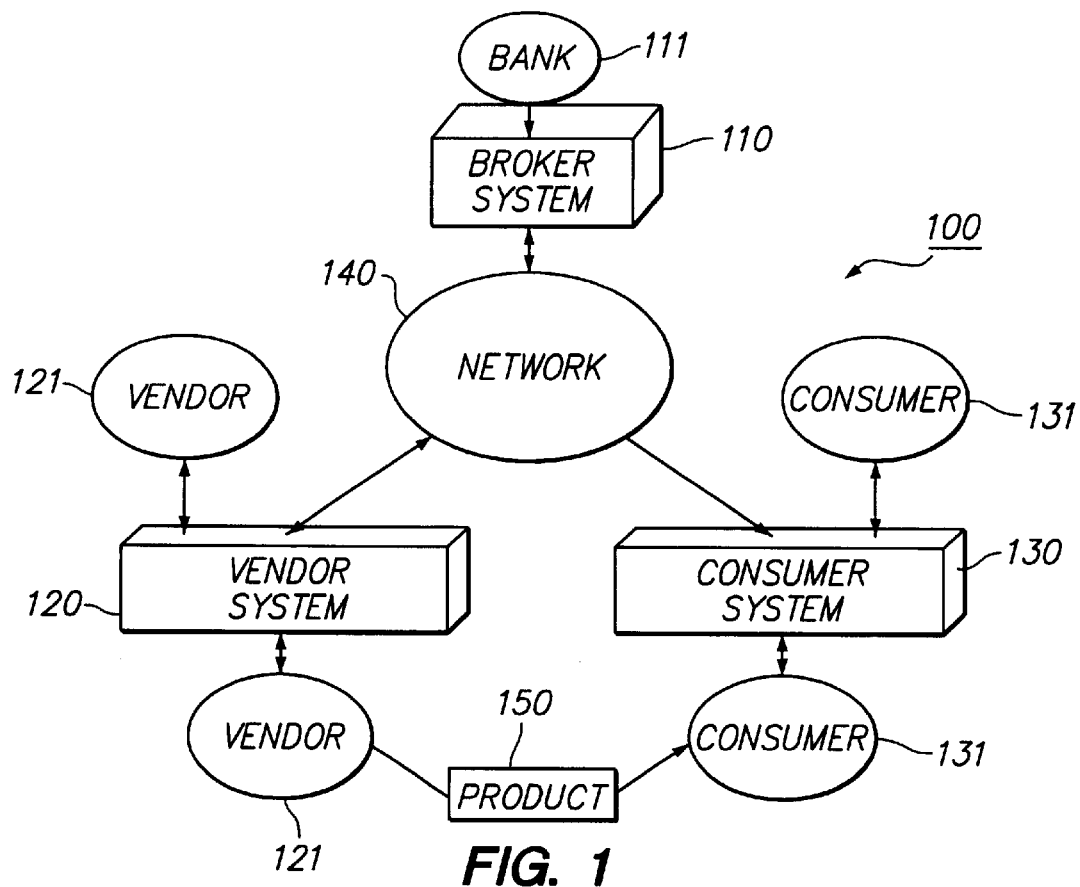
FIG. 1 is a top-level block diagram of a computerized system for conducting computerized commerce.

FIG. 1 shows a computerized system 100 for conducting computerized commerce according to the principles of the invention. The system 100 includes a broker system 110, a vendor system 120, and a consumer system 130 interconnected by a communications network 140.

For clarity, the system 100 depicted in FIG. 1 shows only single broker, vendor, and consumer systems. In actual practice, any number of broker, vendor, and consumer systems can be interconnected by the network 140.

The user 111 of the broker system 110 can be a bank, a credit provider, an Internet service provider, a telephone company, or any other institution the consumer trusts to sell scrip. The vendor system 120 is operated by a vendor 121. The vendor 121 provides products 150 of any type to consumers.

A consumer 131 can use the consumer computer system 130 to "electronically" acquire the products 150 of the vendor 121. The network 140 can be public or private, such as, for example, the Internet, a switched telephone system, a satellite linked network, or another form of network.

Figure 2:
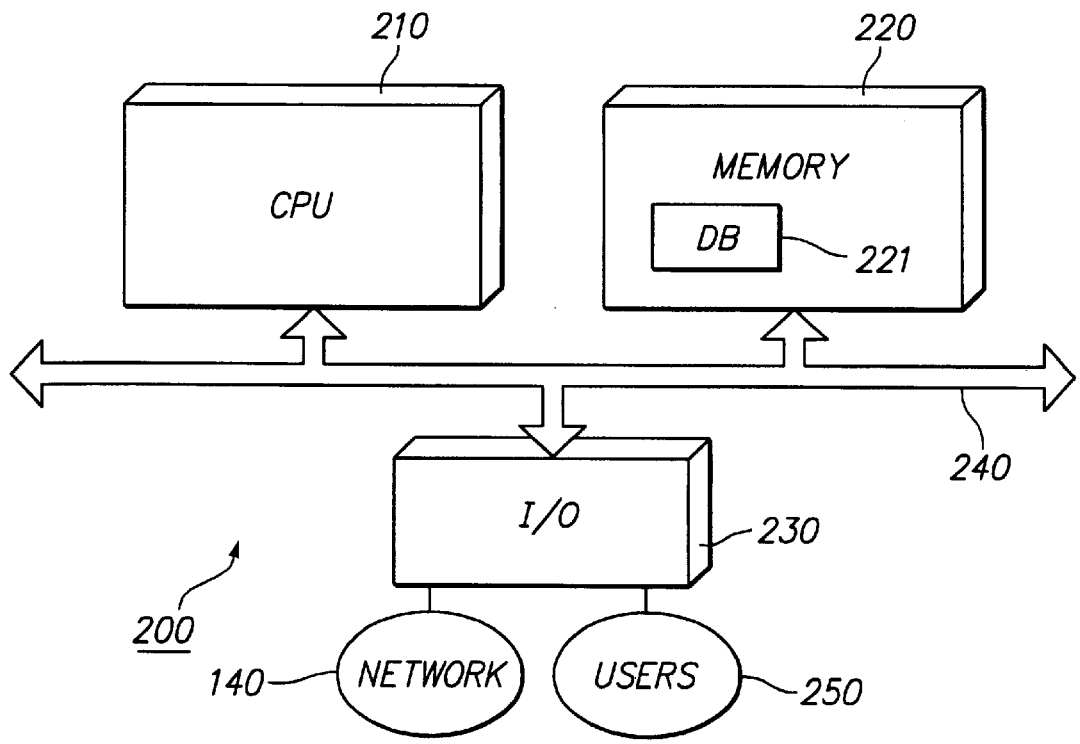
FIG. 2 is a block diagram of a computer system used in the system of FIG. 1.

A computer system 200 suitable for use as the broker, vendor, and consumer systems is shown in FIG. 2. The computer system 200 includes a central processing unit (CPU) 210, a memory 220, and an input/output interface 230 connected to each other by a communications bus 240. The CPU 210, at the direction of users 250, e.g. brokers, vendors, and/or consumers, executes software programs for manipulating data. The programs and data can be stored in the memory 220 as a database (DB) 221. The DB 221 storing programs and data on the consumer computer system 130 is referred to as a "wallet."

The memory 220 can include volatile semiconductor memory as well as persistent storage media, such as disks. The I/O interface 230 is for communicating data with the network 140, the users 250, and other computer system peripheral equipment, such as printers, tapes, etc.

The computer system 200 is scaled in size to function as the broker, vendor, or consumer systems. For example, when scaled as the consumer computer system 130, the computer system 200 can be a small personal computer (PC), fixed or portable. The configurations of the computer system 200 suitable for use by the broker 111 and the vendor 121 may include multiple processors and large database equipped with "fail-safe" features. The fail-safe features ensure that the database 221 is securely maintained for long periods of time.

Figure 3:
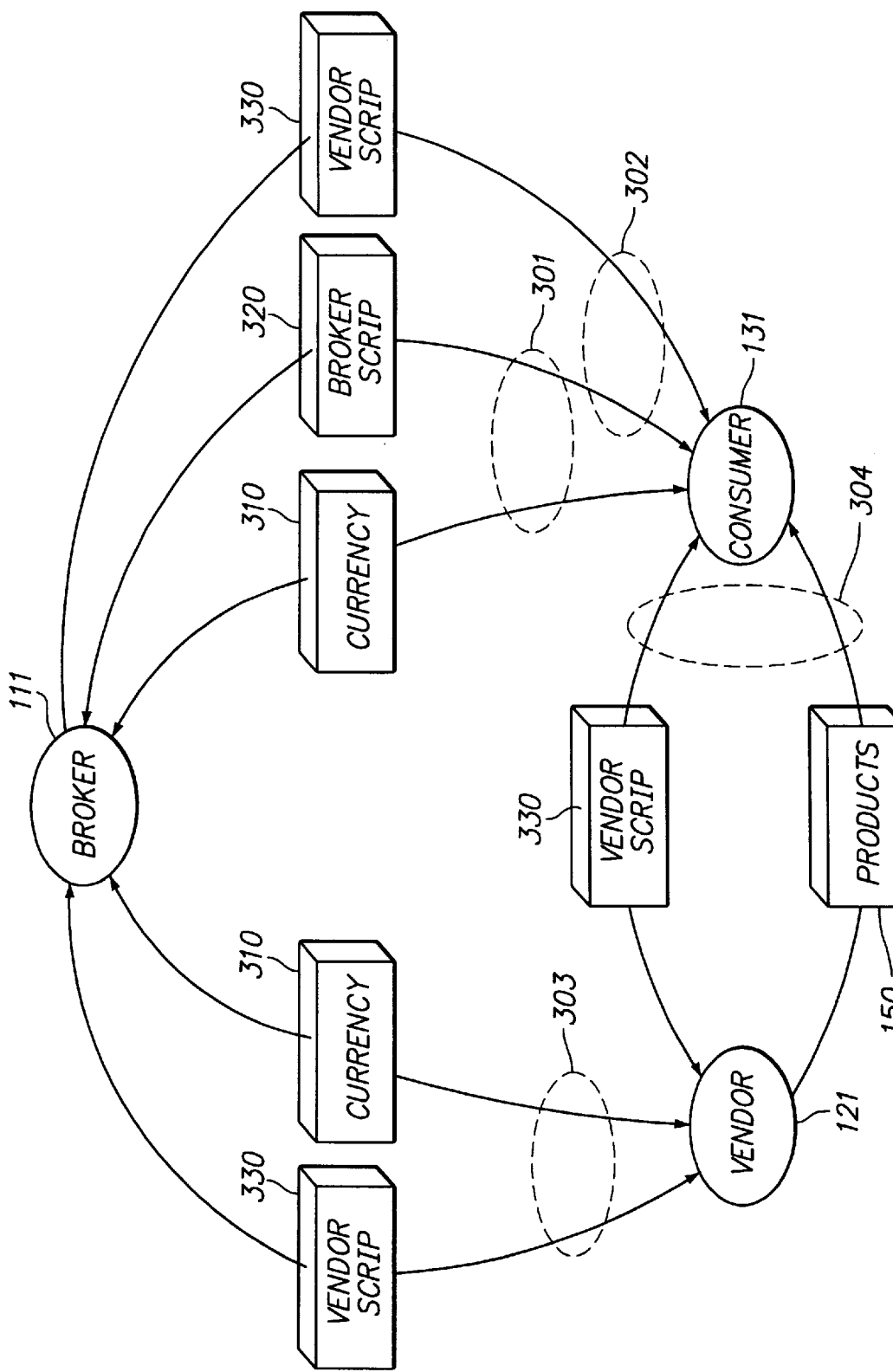
FIG. 3 is a flow diagram of the operations of the system of FIG. 1.
Figure 3A:
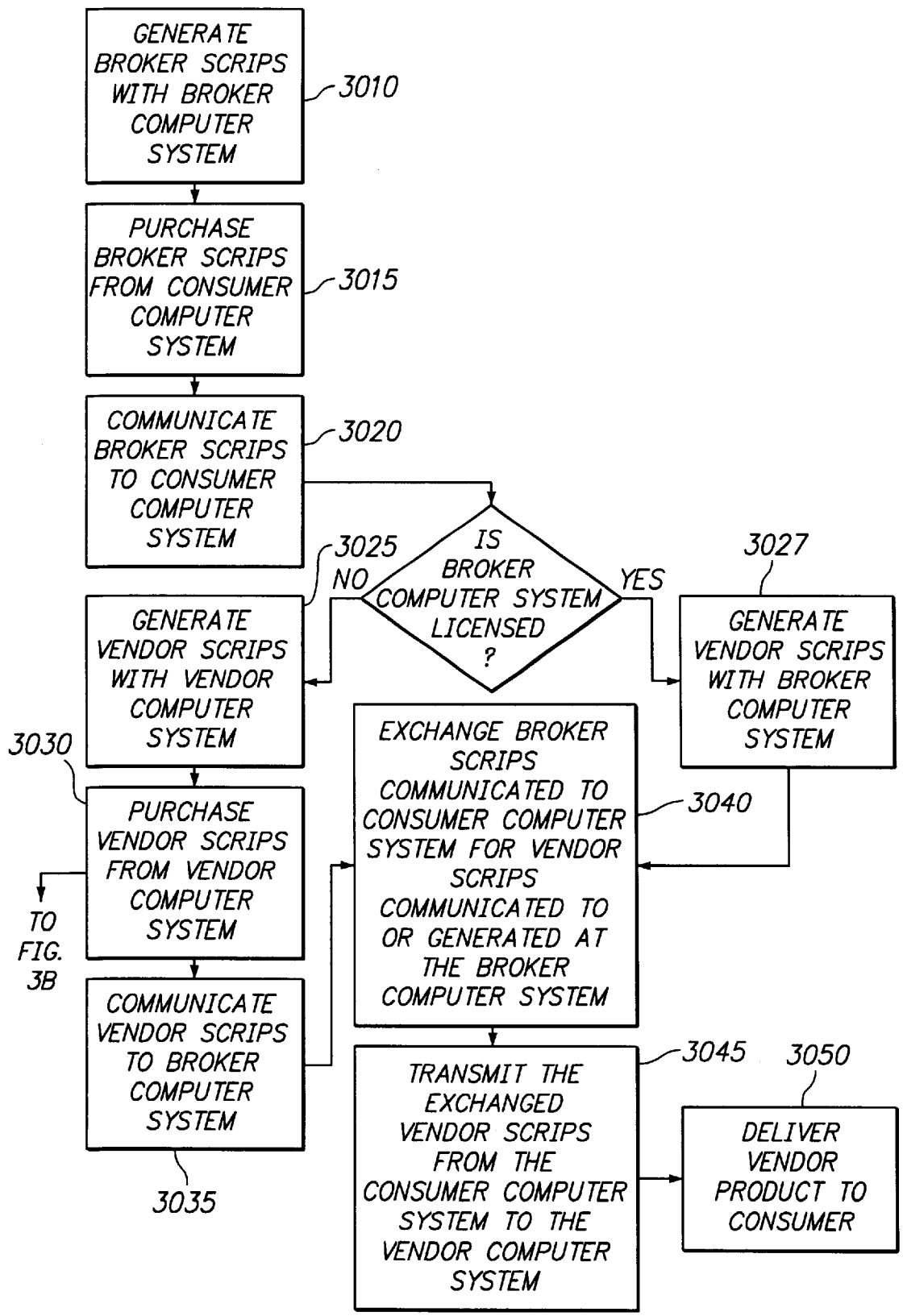
FIG. 3A is a flow chart of certain operations depicted in FIG. 3.

FIG. 3 and FIG. 3A show an operation of the system 100 according to a preferred embodiment of the invention. The consumer 131 in step 3015 uses currency to purchase electronic broker scrip 320 generated in step 3010 by the broker 111. Here, purchasing means that upon a validation of the authenticity of the consumer 131 and the consumer's currency 310, the broker system 110 generates signals, in the form of data records. The signals in step 3020 are communicated, via the network 140, to the consumer system 130 for storage in the wallet 221 of the memory 220 of the consumer system 130.

The currency 310 which is exchanged for scrip 320 can be cash, check, credit card, bank ATM card, debit card, phone card, or other items of value. The scrip 320 can also be freely exchanged for "coupons" frequently used in promotional schemes. The "coupons" can be in form of the scrip.

The scrip is described in further detail below. In brief, the scrip is stamped by the generator of the scrip. This means that the scrip carries information that is verifiable by only the originator. In addition, each scrip is uniquely identifiable. After a single use, the originator of the scrip can "invalidate it." Invalidated meaning that the signals of the data record are no longer accepted for processing by the originating computer system.

Preferably, the broker system 110 in step 3027 executes licensed software programs which generate vendor scrip 330 for the consumer 131 as needed. In this case, the "value" of the license can be proportional to the amount of scrip that the licensee can generate. Alternatively, the broker 111, in a similar transaction 303, as described above, exchanges currency 310 for bulk electronic vendor scrip 330 in step 3030 and 3035. The vendor scrip 330 is generated in step 3025 by the vendor system 120.

The consumer 131 desiring the products 150 provided by the vendor 121, can exchange 3040, 3045, 302 the broker scrip 320 for vendor scrip 330. If the purchase price of the product 150 is less than the value of the vendor scrip 330, new vendor scrip can be issued for the balance as "change." A separate transaction type allows consumers 131 to ask vendors 121 to turn vendor scrip 330 back into currency 310 or broker scrip 320, probably for a fee.

In an alternative embodiment shown in FIG. 3, FIG. 3A and FIG. 3B, the consumer 131 can establish an "account" with the vendor 121 to acquire vendor scrip 330 directly, without the need of a third party broker as indicated in steps 3055 and 3060.

Establishing an account means that an account data record is maintained in the vendor computer system 120.

The consumer 131, in a transaction 304, submits in step 3045, the vendor scrip 330 to the vendor 121. The vendor 121 decrypts the vendor scrip 330 to verify its authenticity, and to validate the "currency" amount. Verification also checks the local database to determine whether the scrip is previously unspent. Approval of the transaction 303 results in the delivery of the desired product 150 to the consumer 131 in step 3050. In the transaction 304, change can also be returned to the consumer 131 in the form of vendor scrip having a value which is the amount of the over-payment, e.g., another data record communicated by the network 140.

The electronic signals which represent the scrip, and which are processed and communicated by the system 100 are described with reference to FIG. 4. FIG. 4 is a block diagram illustrating the data fields of a single piece of scrip 400 according to one embodiment of the present invention. The scrip 400 is logically separated into seven data fields. The Vendor field 410 identifies the vendor for the scrip 400. The Value field 412 gives the value of the scrip 400. The Scrip ID field 414 is the unique identifier of the scrip. The Customer ID field 416 is used by the broker 111 and vendor 121 to determine a customer secret ("CS") for the scrip. The Expires field 418 gives the expiration time for the scrip 400. The Props field 420 holds customer properties, such as the customer age, state of residence, etc. Finally, the Stamp field 422 holds a digital signature and is used to detect tampering of the scrip 400.

When issuing scrip, the broker 111 generates the CS based on the Customer ID and transmits it to the consumer 131. If this is the first piece of scrip purchased by the consumer 131 from the broker 111, the CS is provided to the consumer 131 via a secure channel. A preferred secure channel is described in U.S. patent application Ser. No. 09/081,521, entitled METHOD FOR COMMUNICATING SECURE AND AUTHENTICATED TRANSACTIONS OVER AN NON-SECURE NETWORK SUBJECT TO EXPORT RESTRICTIONS, which was filed on May 19, 1998, and is hereby incorporated by reference herein.

If the consumer 131 has already received a CS from the broker 111, then the broker 111 (or vendor 121, if the vendor is giving change or a refund) uses the previously provided CS (the old CS, or OCS) to transmit a new CS (NCS) to the consumer 131 without requiring a secure channel. The broker 111 calculates the NCS by using the Customer ID field 416 in the same manner that the OCS was calculated. Then, the broker 111 calculates a result as follows:

$$\text{result} = \text{NCS XOR H}(cs_{13}\text{ nonce, OCS}),$$

where H( ) is a hash function, "XOR" is the exclusive-or function, and cs_nonce is a nonce, i.e., a random, guaranteed unique string. In one embodiment, the hash function used throughout the electronic commerce system is MD5, described in R. Rivest, "The MD5 Message Digest Algorithm," RFC 1321, April 1992, which is hereby incorporated by reference herein. The result and the cs_nonce are passed to the consumer 131.

When the consumer 131 receives the result and cs_nonce, the consumer 131 derives the NCS by performing the calculation:

$$\text{NCS} = \text{result XOR H}(cs\_\text{nonce, OCS}).$$

The consumer 131 preferably stores the NCS with the corresponding scrip 400 in the wallet 221. Thus, the broker 111 communicates the value of the NCS to the consumer 131 without actually transmitting the NCS. The consumer 131 uses the CS to prove ownership of, i.e. possession of the right to spend, scrip.

In a preferred embodiment of the present invention, the consumer 131 requests product from the vendor 121 in the context of the World Wide Web (WWW). Accordingly, the request is phrased as a uniform resource locator (URL) pointing to a location at a vendor-controlled domain.

To spend scrip 400 for a product, the consumer 131 sends the vendor 121 a message in the form:

$$\text{scrip, request, H(scrip, request, CS)},$$

where scrip is the vendor scrip 400 issued to the consumer, the request is the URL specifying the requested product, and H(scrip, request, CS) is a hash of the scrip, request, and the CS. Thus, the consumer 131 sends the scrip in the clear (unencrypted).

When the vendor 121 receives the scrip 400, the vendor 121 first validates the Stamp field 422 to ensure that the scrip 400 was not altered. Next, the vendor 121 uses the CS to validate that the consumer 131 is authorized to spend the scrip 400. Once the vendor 121 has validated the scrip 400 and consumer 131, the vendor preferably provides the requested product to the consumer 131. Also, the vendor 121 may issue scrip to the consumer 131 as change by using the techniques described above.

Implicit in the above description of the electronic commerce system is that the consumer 131 must keep confidential the CS of the scrip 400 in the wallet 221. Otherwise, an unauthorized third party could spend the scrip 400 without the knowledge of the consumer 131. Accordingly, the CS in the wallet 221 must be protected from attack. Therefore, a preferred embodiment of the present invention uses a strengthened password scheme to encrypt the CS in the wallet 221.

Figure 6:
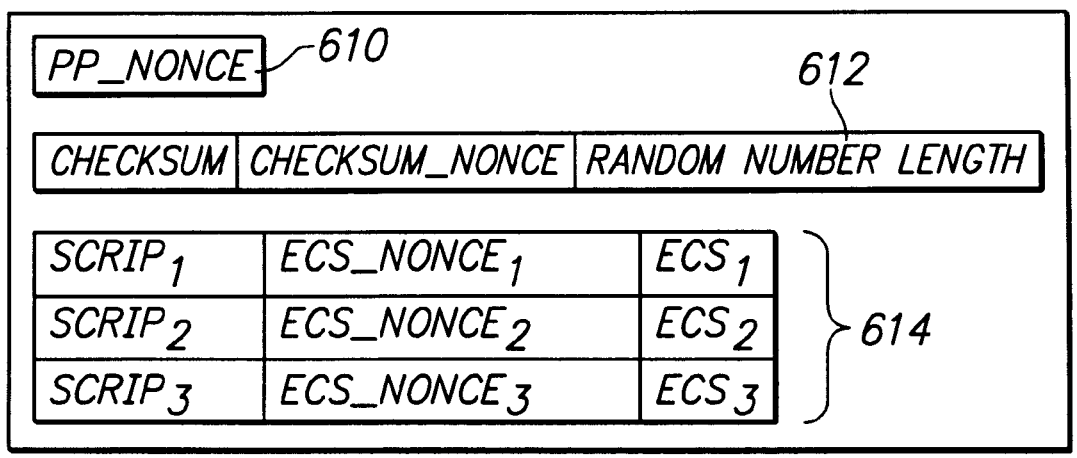
FIG. 6 is a block diagram illustrating the logical structure of a wallet file on a consumer computer system.

FIG. 5 is a flowchart illustrating the steps performed by a preferred embodiment of the present invention to protect the scrip 400 in the wallet 221 from a third party attack. In addition, FIG. 6 is a block diagram illustrating the logical structure of the wallet file 221 in the consumer computer system 130. First, the consumer 131 provides 510 a pass phrase for the wallet 221. To provide the best security, the pass phrase should be long, contain upper case and lower case letters, contain numbers, contain punctuation marks, and not be a word. However, consumers 130 typically choose poor (i.e., easily guessable) pass phrases.

Therefore, the wallet 221 uses the consumer-chosen pass phrase as a portion of an internal pass phrase. To form the internal pass phrase, the wallet 221 preferably appends 512 a nonce, called the pp_nonce, to the end of the consumer-chosen pass phrase. In addition, the wallet 221 generates 514 an n-bit random number (i.e., a random string of bits) and appends the random number to the consumer-chosen pass phrase/pp_nonce string. The resulting string is the internal pass phrase. The pp_nonce is written to a header 610 in the wallet 221.

The length of the n-bit random number is preferably determined by the capabilities of the consumer's computer system 130. For example, in one embodiment the length of the random number is determined by the time it takes the consumer's computer system 130 to perform the basic unit of an encryption algorithm (in a preferred case, MD5). This embodiment determines how many calculations the computer system 130 can perform in some time duration, such as one second, and then picks the length of the number so that the calculations to guess the number take "long enough." For example, if the computer system 130 can perform 500,000 calculations in a second, the random number could be about 20 bits in length. Since 20 bits corresponds to about one million values, on the average it would take 500,000 calculations for the consumer's computer system 130 to guess the correct value of the random number, adding an average delay of one second to the time required to validate the consumer's pass phrase.

A checksum is generated 516 from the internal pass phrase by the equation:

checksum=H(checksum_nonce, internal pass phrase), where the checksum_nonce is a new nonce. The triple (checksum_nonce, length, checksum) 612 is then stored 518 in the wallet 221, where "length" is the number of bits in the random number.

In addition, each CS associated with a scrip 400 held in the wallet 221 is also encrypted 520 using the internal pass phrase. Preferably, an encrypted CS (ECS) is formed using the equation:

ECS=H(ecs_nonce, internal pass phrase) XOR CS, where the ecs_nonce is a different nonce than the nonces described above. This manner of encryption is effective because the hash result has the same number of bits as the CS and the exclusive-or function can be used to encode the ECS. For each scrip, the wallet stores a (scrip, ecs_nonce, ECS) triple 614 with a unique nonce. Accordingly, the scrip secrets are encrypted and the scrip 400 is unusable without the internal pass phrase. Preferably, new nonces are generated every time the wallet file is written, thereby causing a new internal pass phrase, a new checksum, and new ECS to be written to the wallet 221.

Figure 7:
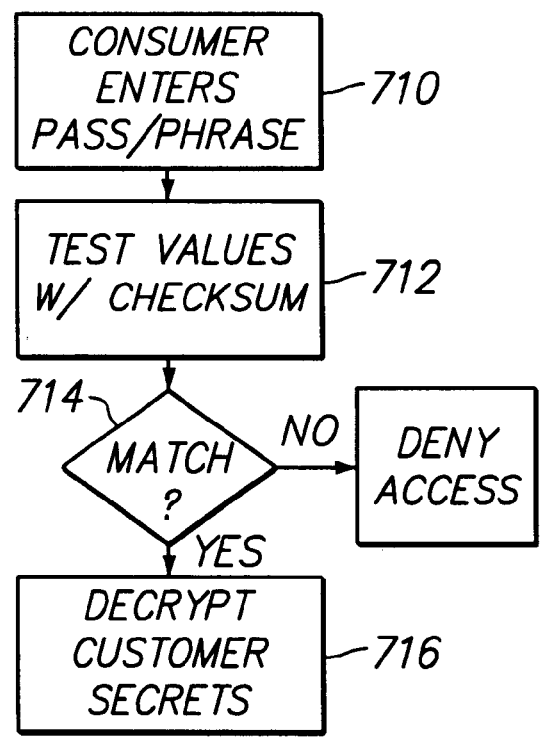
FIG. 7 is a flowchart illustrating the steps performed by a preferred embodiment of the present invention when a consumer logs into the wallet.

FIG. 7 is a flowchart illustrating the steps performed by a preferred embodiment of the present invention when a consumer 131 logs into the wallet 221. First, the consumer 131 provides a pass phrase to the wallet 221. In response, the wallet 221 reads the pp_nonce from the header 610 of the wallet and reads the (checksum_nonce, length, checksum) triple 612 stored in the wallet. Next, the wallet 221 begins calculating the hash function for all possible values of the n-bit random number having the length described in the triple 612:

H(checksum_nonce, provided pass phrase+pp_nonce+00000 . . . 000);

H(checksum_nonce, provided pass phrase+pp_nonce+00000 . . . 001);

H(checksum_nonce, provided pass phrase+pp_nonce+00000 . . . 010);

H(checksum_nonce, provided pass phrase+pp_nonce+00000 . . . 011);

. . . , where "provided pass phrase" is the phrase provided by the consumer 131 and the '+' operator denotes concatenation.

As each hash is generated, the wallet 221 tests 712 the value of the hash against the checksum stored in the triple 612. If the hash matches 714 the checksum, then the consumer 131 has provided a valid pass phrase. If none of the hashes match the checksum, the provided pass phrase is invalid and the wallet 221 denies access to the consumer 131.

In a preferred embodiment of the present invention, the search for the short random number does not always start with the same initial value. If it did, an attacker could time how long the wallet 221 took to find the correct number and then use that time to narrow the range of possible values. Accordingly, the search preferably starts at a random value in the correct range and then wraps around to the initial value if a match is not found in the upper part of the range.

Once a matching pass phrase is found, the wallet 221 preferably decrypts the ECS for the scrip 400 in the wallet. For each scrip, the wallet 221 reads the (scrip, ecs_nonce, ECS) triple 614 and repeats the calculation used to derive it, except that instead of XORing the H(ecs_nonce, internal pass phrase) calculation with the CS, the wallet XORs it with the ECS. Thus, the wallet 221 performs the calculation:

CS=H(ecs_nonce, internal pass phrase) XOR ECS to decrypt each CS.

The described invention for strengthening the pass phrases protects the wallet 221 from consumers' 130 poor choices of pass phrases. The nonce makes all internal pass phrases unique, even if the consumers choose common pass phrases. Thus, the explicit nonce helps protect the wallet 221 from an off-line, pre-computed attack.

Most importantly, the random number raises the effort required by a "dictionary" attack. A dictionary attack is possible because consumers 130 choose bad pass phrases—often ordinary words. An attacker could take a large dictionary and just try every word in the dictionary as the consumer's pass phrase. If the consumer 131 chooses a word in the dictionary, then eventually the attacker will find the pass phrase.

Since computers are getting faster, the cost of a dictionary attack is decreasing. However, adding the random number to the pass phrase raises the cost of checking each dictionary entry. Instead of doing just one hash to test each word, the attacker must perform many hashes—one for each possible value of the random number—for each entry. As computers get faster, the length of the random string is increased to keep the cost of a dictionary attack relatively constant.

In addition, the disclosed invention limits the total volume of the material that is encrypted. Since only the CS of each piece of scrip is encrypted rather than the entire body of the scrip, the present invention may be utilized in environments where bulk encryption systems and methods are prohibited or undesirable.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

We claim:

1. A method of encrypting data on a computer system, comprising the steps of:

accepting a pass phrase;

strengthening the pass phrase with a random number to make the pass phrase harder to determine;

hashing a first nonce with the strengthened pass phase to produce a result; and encoding the result with the data to produce encrypted data;

wherein a length of the random number is determined responsive to the processing speed of the computer system.

2. The method of claim 1, wherein the encoding step comprises the step of:

exclusive-oring the result with the data.

3. The method of claim 1, wherein the strengthening step comprises the step of:

concatenating the pass phrase, a second nonce, and the random number to form the strengthened pass phrase.

4. The method of claim 3, further comprising the step of:

storing the first nonce, the second nonce, and the length of the random number with the encrypted data.

5. The method of claim 1, further comprising the step of:

hashing the strengthened pass phrase with a third nonce to produce a checksum;

wherein the encrypted data cannot be decrypted without reproducing the checksum.

6. A method of decrypting encrypted data, comprising the steps of:

accepting a pass phrase;

concatenating the pass phrase, a first nonce, and a random number to form a concatenated pass phrase;

hashing the concatenated pass phrase with a second nonce to produce a result;

comparing the result to a previously calculated checksum;

iterating the concatenating, hashing, and comparing steps using different numbers of a same length until a stopping condition is reached;

wherein the stopping condition is reached when the result matches the checksum;

wherein the stopping condition is reached when all of the numbers having the same length have been compared without the result matching the checksum; and wherein the result is utilized to decrypt the encrypted data if the result matches the checksum.

7. The method of claim 6, wherein the decrypting step comprises the step of:

exclusive-oring the first result with the encrypted data.

8. The method of claim 8, further comprising the step of:

selecting a first number having the same length;

wherein the iterating step starts at the selected first number, increments the number for each iteration, and wraps around to the lowest possible number having the same length if the highest possible number having the same length is reached without reaching a stopping condition.

9. A computer program product having a computer readable medium, the computer readable medium having computer instructions encoded thereon for encrypting data, the computer instructions comprising instructions for:

accepting a pass phrase;

strengthening the pass phrase with a random number to make the pass phrase harder to determine;

hashing the strengthened pass phrase with a first nonce to produce a first result; and encoding the first result with the data to produce encrypted data;

wherein a length of the random number is determined responsive to a processing speed of the computer.

10. The computer program product of claim 9, wherein the instructions for encoding comprise instructions for:

exclusive-oring the first result with the data.

11. The compute program product of claim 9, further comprising instructions for:

hashing the strengthened pass phrase with a second nonce to produce a first checksum.

12. The computer program product of claim 11, further comprising instructions for:

comparing a second checksum with the first checksum; and decrypting the encrypted data if the second checksum matches the first checksum.

13. The computer program product of claim 12, wherein the instructions for decrypting the data comprise instructions for:

hashing the pass phrase with the first nonce to produce a second result; and decoding the second result with the encrypted data to produce the decrypted data.

14. The computer program product of claim 13, wherein the instructions for decoding comprise instructions for:

exclusive-oring the second result with the encrypted data.

15. A computer system, comprising:

a memory for holding data;

a module for receiving a pass phrase for the data held in the memory;

a module for strengthening the pass phrase with a random number to produce a internal pass phrase;

a module for hashing a first nonce with the internal pass phrase to produce a first result; and a module for encoding the first result with the data to produce encrypted data;

wherein a length of the random number is determined responsive to a processing speed of the computer system.

16. The computer system of claim 15, wherein the module for encoding comprises:

a module for exclusive-oring the result with the data.

17. The computer system of claim 15, further comprising:

a module for hashing the internal pass phrase with a second nonce to produce a first checksum.

18. The computer system of claim 27, further comprising:

a module for comparing a second checksum with the first checksum; and a module for decrypting the encrypted data if the second checksum matches the first checksum.

19. The computer system of claim 18, wherein the module for decrypting the data comprises:

a module for hashing the internal pass phrase with the second nonce to produce a second result; and a module for decoding the second result with the encrypted data to produce the decrypted data.

20. The computer system of claim 19, wherein the module for decoding the second result comprises:

a module for exclusive-oring the second result with the decrypted data.

* * * * *

UNITED STATES PATENT AND TRADEMARK OFFICE
CERTIFICATE OF CORRECTION

PATENT NO. : 6,424,953 B1
DATED : July 23, 2002
INVENTOR(S) : Steven C. Glassman and Mark S. Manasse It is certified that error appears in the above-identified patent and that said Letters Patent is hereby corrected as shown below:

Column 9,
Line 28, replace "phase" with -- phrase --.

Column 10,
Line 7, replace "8" with -- 6 --.
Line 33, replace "compute" with -- computer --.

Column 11,
Line 7, replace "27" with -- 17 --.

Signed and Sealed this

Twelfth Day of November, 2002

Attest:

Attesting Officer

JAMES E. ROGAN
*Director of the United States Patent and Trademark Office*